United States Patent [19]
Brouwer

[11] Patent Number: 6,099,433
[45] Date of Patent: Aug. 8, 2000

[54] DRIVING UNIT WITH ADJUSTABLE TORQUE

[75] Inventor: Stefan Frits Brouwer, The Hague, Netherlands

[73] Assignee: IKU Holding Montfoort B.V. et al., Montfort, Netherlands

[21] Appl. No.: 09/051,531

[22] PCT Filed: Oct. 14, 1996

[86] PCT No.: PCT/NL96/00397

§ 371 Date: Sep. 14, 1998

§ 102(e) Date: Sep. 14, 1998

[87] PCT Pub. No.: WO97/14208

PCT Pub. Date: Apr. 17, 1997

[30] Foreign Application Priority Data

Oct. 12, 1995 [NL] Netherlands ............................ 1001412

[51] Int. Cl.[7] .................................................. F16H 57/10
[52] U.S. Cl. ........................ 475/342; 475/321; 475/265; 475/153
[58] Field of Search ...................... 475/338, 341, 475/342, 149, 153, 317, 321, 263, 264, 265; 192/223, 56.55, 56.6, 56.1; 464/47

[56] References Cited

U.S. PATENT DOCUMENTS

| | | | |
|---|---|---|---|
| 1,318,568 | 10/1919 | Kittredge | 475/321 X |
| 1,413,292 | 4/1922 | Rauscher | 475/321 X |
| 3,646,375 | 2/1972 | Mader | 310/83 |
| 4,155,275 | 5/1979 | Devanney | 475/342 X |
| 4,614,134 | 9/1986 | Bohle | 475/265 X |
| 4,791,833 | 12/1988 | Sakai et al. | 475/320 X |
| 4,834,192 | 5/1989 | Hansson | 475/263 X |
| 5,385,512 | 1/1995 | Moolenaar et al. | 475/153 |
| 5,630,771 | 5/1997 | Weber et al. | 475/338 |
| 5,897,454 | 4/1999 | Cannaliato | 475/265 |

FOREIGN PATENT DOCUMENTS 63-1837  1/1988  Japan ...................... 475/342

Primary Examiner—Charles A. Marmor
Assistant Examiner—Scott Lund
Attorney, Agent, or Firm—Roger A. Johnston

[57] ABSTRACT

A driving unit (1), comprising: a motor (10), a driven shaft (2) driven by the motor, and a transmission device (20) coupled between the motor and the output shaft and having one input shaft (21) and two rotational output members (22) and (23), wherein the ratio of transmission from the input shaft (21) to the first rotational output member (22) differs from the ratio of transmission from the input shaft (21) to the second rotational output member (23). The first rotational output member (22) is coupled to the motor housing (11) via a slip coupling (30). A helical spring (60) arranged so as to be coaxial to the motor presses the first rotational output member (23) against the motor housing (11), wherein that helical spring (60) engages the motor housing (11) via a pressure ring (50). This pressure ring (50) has a helical channel (52) for receiving the helical spring (60). The pressure ring (50) is rotatable to enable setting the maximum value of the moment that can be supplied to the output shaft (2).

6 Claims, 1 Drawing Sheet

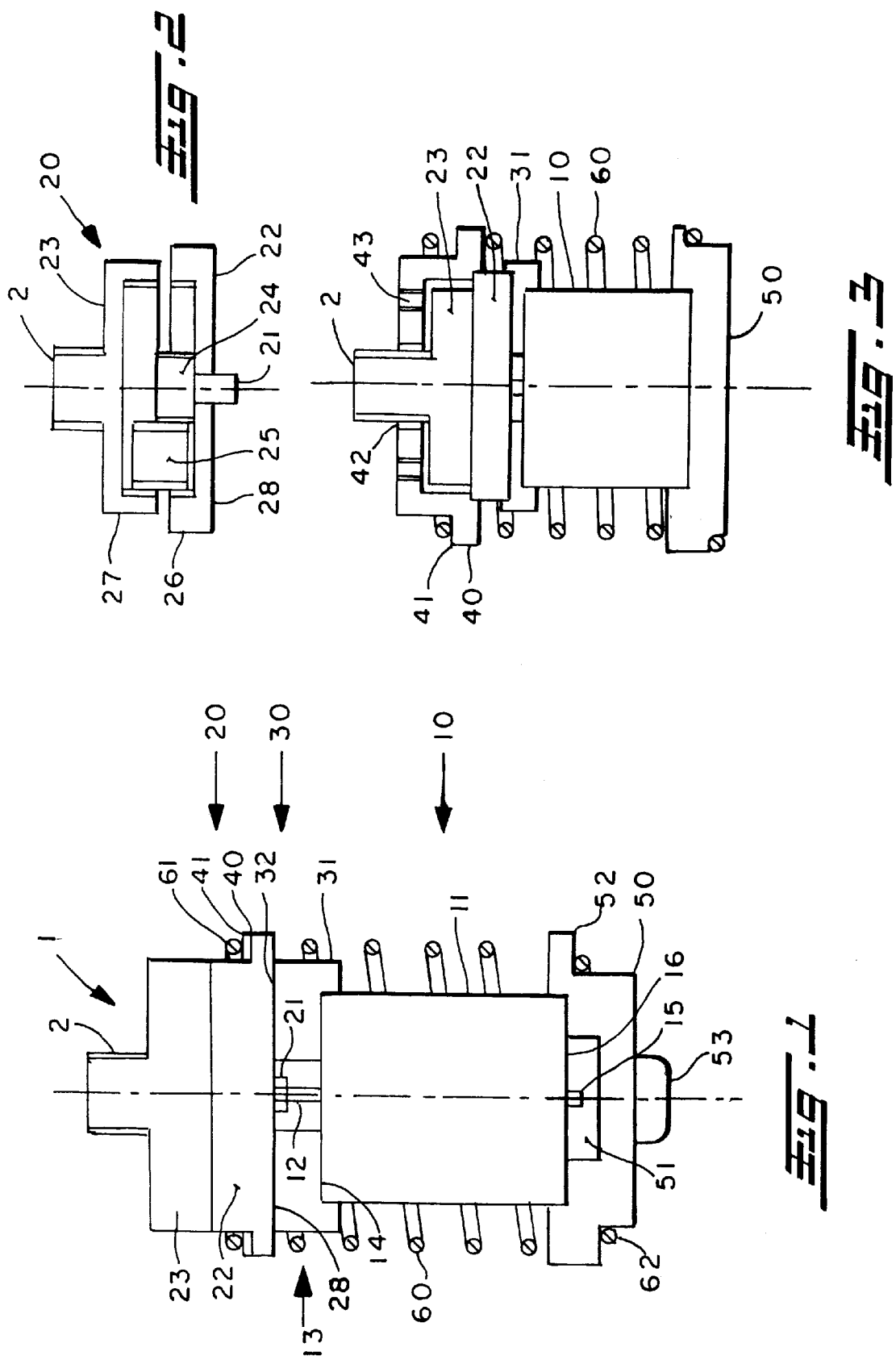

DRIVING UNIT WITH ADJUSTABLE TORQUE

The invention relates to a driving unit with a motor and an output shaft driven by the motor, and a transmission device coupled between the motor and the output shaft, which driving supplied to the output shaft having a predetermined maximum value. Within the framework of the present invention, the expression "driving unit" is understood to mean that the motor, the transmission device and the output shaft have been assembled to form an integrated unit.

Such driving units are known per se. The motor is for instance an electromotor, and the transmission device is present to cause the speed of the output shaft to differ from the speed of the motor. As is known, each motor is designed for a specific maximum load. As soon as the momentary load of the output shaft exceeds the torque that can be provided by the motor, the motor will slow down and eventually even come to a standstill. However, such an overload of the motor is injurious to the motor and/or to the different parts of the transmission and/or the use.

Within the framework of the present application, a "slip coupling" is understood to mean a device having at least two parts that are coupled together to transmit a specific force/moment. If the load of those parts is slight, they will behave like a rigid whole and transmit a force or moment virtually without loss. If the load reaches a predetermined value those parts will start slipping relative to each other, so that the force or moment to the transmitted cannot be greater than that predetermined value, which will hereinafter be referred to as "limit value" or "slip value".

In known driving units, a slip coupling is included in the power-transmitting path between the motor and the output shaft, of which slip coupling the limit value is lower than the maximum power of the motor. It is thus provided that the torque supplied to the output shaft cannot exceed a predetermined value defined by the limit value, without the motor coming to a standstill.

U.S. Pat. No. 4,791,833 describes a driving device wherein a pressure-loaded spring operates an overload protection. This pressure-loaded spring is arranged so as to be coaxial to the motor, but is axially in a different position, so that the axial length of the device is relatively great. The adjusting possibilities for the pressing force of the pressure-loaded spring are relatively limited. Further, the construction of this known device are relatively complicated, because fastening members such as screws are required for fixing the different parts together.

U.S. Pat. No. 2,646,375 describes a fairly complicated driving device wherein a pressure-loaded helical spring is arranged at the center of a stator coil, which helical spring exerts a pressing force pressing two rotational output members together. In view of the necessarily slight dimensions of the helical spring, the force that can be exerted thereby is limited. Further, for housing and protecting the device, a housing extending around the motor and transmission members is required.

It is an object of the invention to provide a compact driving unit which can be manufactured and assembled in a simple and hence relatively cheap manner, and of which the above-mentioned limit value can readily and continuously be adjusted.

It is a further object of the invention to provide a driving unit wherein, at constant load on the output shaft, a change of the limit value of the slip coupling does not lead to a change of the axial motor load.

It is a further object of the invention to provide a driving unit wherein the helical spring is of a relatively large design and subjected to a pull, wherein the helical spring also serves to protect the motor and transmnission members.

To that end, the device according to the invention has the features as described in claim 1.

These and other aspects, features and advantages of the present invention will be explained by the following description of a preferred embodiment of a driving unit according to the invention, with reference to the accompanying drawing, wherein:

FIG. 1 is a schematic cross section of a preferred embodiment of a driving unit according to the invention;

FIG. 2 is a schematic cross section of a preferred embodiment of a transmission system for use in the driving unit according to the invention; and FIG. 3 schematically shows a variant of a driving unit according to the invention.

FIG. 1 schematically shows the construction of a preferred embodiment of a driving unit, which is generally designated by the reference numeral 1, and which has an output shaft 2 driven by an electromotor unit 10. The electromotor unit 10 comprises a motor housing 11 and a driven shaft 12 bearing-mounted for rotation in the motor housing it. The front end 13 of the driven shaft 12 projects outwards through a front face 14 of the motor housing 11. Opposite the front face 14, the motor housing 11 has a rear face 16, which can be entirely flat, but it is also possible that it has a rear end 15 of the driven shaft 12 extending therethrough, as shown.

For simplicity's sake, connecting wires for feeding electric power to the motor 10 are not shown.

As the nature and construction of the motor 10 do not constitute a subject of the present invention, and a skilled person need not have knowledge thereof for a proper understanding of the present invention, they will not be further described.

The driving unit 1 further comprises a transmission device 20 having an input shaft 21 and two rotational output members 22 and 23, also referred to as output shafts 22 and 23, which, in the example shown, are coaxial to each other, the first output shaft 22 being located on the side of the motor 10. Preferably, the transmission device 20 comprises a planetary gearing. Planetary gearings are known per se; hence, with reference to FIG. 2, the operation of a planet gearing will be explained only briefly.

FIG. 2 schematically shows a cross section of an example of a transmission device 20 designed as planetary gearing, the first rotational output member 22 comprising a first gear ring 26 having an internal toothing, and the second rotational output member 23 comprising a second gear ring 27 having an internal toothing. On the input shaft 21, a sun wheel 24 is formed. The sun wheel 24 is in engagement with at least one planetary gear 25. In general, the number of planetary gears 25 is greater than 1, and a number found suitable is three; for simplicity's sake, only one planetary gear 25 is shown in FIG. 2.

The planetary gears 25, mutually identical, are in engagement with the two gear rings 26 and 27. The first gear ring 26 is provided, adjacent its axial center, with an opening through which the input shaft 21 extends. The second gear ring 27 drives the output shaft 2 and can form a whole therewith, as shown.

The ratio of transmission from a planetary gear 25 to the first gear ring 26 differs from the ratio of transmission from that planetary gear 25 to the second gear ring 27. This can for instance be effected in that the number of teeth of the first gear ring 26 differs from the number of teeth of the second gear ring 27. The difference in the number of teeth can be small, and can for instance be equal to 1. As a consequence of such difference, there will always be a difference between the rotational speed of the first gear ring 26 and the rotational speed of the second gear ring 27 when the input shaft 21 is rotated relative to the output shafts 22 and 23. In this connection, two extreme cases are conceivable. In the first extreme case, the first gear ring 26 is stationary relative to a reference such as "the firm world"; when the input shaft 21 is then rotated, the second gear ring 27 and, accordingly, the second rotational output member 23 will rotate relative to that reference. In the second extreme case, the second gear ring 27 is stationary relative to a reference; when the input shaft 21 is then rotated, the first gear ring 26 and, accordingly, the first rotational output member 22 will rotate relative to that reference.

In FIG. 1, where, for simplicity's sake, the details of the preferred planetary gearing 20 have been left out, it is shown that the transmission device 20 is mounted on the motor 10. The input shaft 21 is connected to the driven shaft 12 of the motor 10. The first rotational output member 22 is coupled, by means of a slip coupling 30, to the front face 14 of the motor housing 11. In principle, the first rotational output member 22 can directly abut against the motor housing 11. However, to enable standard motors to be used in a reliable manner, it is preferred that a slip member 31 be included between the first rotational output member 22 and the motor housing 11, which slip member 31 has one side thereof rigidly connected to the motor housing 11, for instance through a form-fit, and has on the other side thereof a surface 32 against which a surface 28 of the first rotational output member 22 abuts, with the frictional force between that surface 32 of the slip member 31 and the surface 28 of the first rotational output member 22 forming part of the slip coupling 30.

The driving unit 1 further comprises a first pressure ring 40 and a second pressure ring 50, and a helical spring 60 (helix).

The first pressure ring 40 is in engagement with the first rotational output member 22, and leaves clear the rotation of the second rotational output member 23 and the output shaft 2.

The second pressure ring 50 is in engagement with the motor housing 11. In principle, the second pressure ring 50 can be located at any axial position if the motor housing 11 is suitable therefor. However, as it is preferred that standard motors can be used, the second pressure ring 50 preferably abuts against the rear face 16 of the motor housing 11. The second pressure ring 50 can be closed to have a disk-shaped appearance, but is in that case preferably provided with an axially arranged chamber 51 for receiving a rear end 15 of the driven shaft 12, which rear end may or may not project from than rear face 16 of the motor housing 11.

The helical spring 60 is in an extended condition relative to its neutral position, and has a first end 61 engaging the first pressure ring 40, and a second end 62 engaging the second pressure ring 50. In this manner, the helical spring 60 exerts an inwardly directed force on the two pressure rings 40 and 50, causing the parts 10, 20, 30, 40, 50 of the driving unit 1 to be held together.

In principle, the first pressure ring 40 can be fixedly connected to the first spring end 61: however, in view of the simplicity, it is preferred that the shape of the first pressure ring 40 be adapted to the screw form of the helical spring 60, and inserted into that helical spring 60, with a coil of the helical spring 60, preferably the extreme coil of the helical spring 60, abutting against a surface 41 of the first pressure ring 40, which surface 41 faces away from the motor 10.

Preferably, means are provided for preventing a rotation of the helical spring 60 relative to the first pressure ring 40. For simplicity's sake, such rotation-restraining means are not separately shown; by way of example, they can be formed by an inwardly bent end of the helical spring 60 fitting in a chamber formed on the first pressure ring 40 or abutting against projections formed on the first pressure ring 40.

The second pressure ring 50 is provided with a helical channel 52 in which at least a portion of a coil of the helical spring 60 fits. Preferably, about 360° of a coil of the helical spring 60 fits in the helical channel 52.

The helical spring 60 does not merely serve for holding together the parts 10, 20, 30, 40 and 50 of the driving unit 1: the helical spring 60 also provides the pressing force with which the surface 32 of the slip member 31 and the surface 28 of the first rotational output member 22 are pressed together. By the magnitude of that pressing force, the above-mentioned slip value of the slip coupling 30 is determined.

In accordance with an important aspect of the present invention, that slip value is even settable after the driving unit 1 has been assembled, in that the pressing force is settable, which is possible because the second pressure ring 50 is rotatable relative to the motor housing 11 and the helical spring 60. in fact, by rotating the second pressure ring 50, this pressure ring screws itself as it were into or out of the helical spring 60; since the second pressure ring 50 cannot move axially, such a rotation of the second pressure ring 50 has as a result that the helical spring 60 is further extended or slackens, so that the pressing force increases or decreases respectively.

This rotation of the second pressure ring 50 can be effected by a special tool, for which purpose the second pressure ring 50 can be provided with specially formed recesses. In a simple embodiment, the second pressure ring 50 is provided with an engagement projection 53, enabling a user to rotate the second pressure ring 50 even manually, if so desired.

The pressing force exerted by the helical spring 60 is transmitted via the path first pressure ring 40→first rotational output member 22→slip member 31→motor housing 11→second pressure ring 50. More in particular, no axial load on the driven motor shaft 12 occurs, Further, the parts of the transmission system 20 are not axially loaded relative to each other. This means that a change of the pressing force of the helical spring 60 does not cause a change of the axial load on these parts.

During use, the motor housing 11 of the driving unit 1 can be directly or indirectly mounted on a part such as a subframe of the practical application. FIG. 3 illustrates a variant of the driving unit 1, that can be mounted in a different manner. The difference between the variant shown in FIG. 3 and the embodiment illustrated in FIG. 1 resides in the shape of the first pressure ring 40. In the variant shown in FIG. 3, this ring has the shape of a cap extending over the transmission system 20 and having an opening 42 through which the output shaft 2 can engage power-transmitting members such as a gear wheel or a gear rack. The first pressure ring 40 further comprises fastening menters 43, such as tapped holes, for mounting the driving unit 1 relative to a part such as a subframe of the practical application. An advantage hereof is that under normal operating conditions, the reactive force does not proceed via the motor housing 11, but via the first rotational output member 22 and the first pressure ring 40.

Under normal operating conditions, the first pressure ring 40 is stationary relative to the first rotational output member 22 and relative to the motor 10, and the output shaft 2 rotates relative to the first pressure ring 40. In the case of overload, for instance when the output shaft 2 is held stationary relative to the practical application and hence relative to the first pressure ring 40, the first rotational output member 22 rotates relative to the slip member 31 and relative co the first pressure ring 40. Hence, the slip value of the slip coupling 30 is determined on the one band by the frictional moment between the first rotational output member 22 and the slip member 31, and on the other by the frictional moment between the first rotational output member 22 and the first pressure ring 40.

A suitable practical application is for instance a mirror-adjusting instrument for adjusting a wing mirror of a vehicle. Normally, the first rotational output member 22 is fixed, via the slip coupling 30, relative to the motor housing 11, and the output shaft 2 rotates relative to the motor housing 11 so as to adjust that wing mirror. If the load on the output shaft 2 becomes too high, for instance because the mirror housing has reached an extreme position or runs against an obstacle, the output shaft 2 will remain stationary relative to the motor housing 11 and the first rotational output member 22 will rotate relative to the motor housing 11. Even if the motor 10 is not switched off, the load on the motor 10 will not be greater than the value determined by the above-mentioned slip value of the slip coupling 30.

Further, when an external force is exerted on the driven part (such as a mirror housing), the transmission system 20 behaves like a rigid whole which will rotate relative to the motor housing 11, with the first rotational output member 22 slipping, via the slip coupling 30, relative to the motor housing 11 (and relative to the pressure ring 40), so that the load on the parts of the transmission system 20 remains limited.

The driving unit according to the present invention has as an advantage, inter alia, that the overload protection can be calibrated at the location of the practical application. The maximum load value allowable can be varied over a relatively large range utilizing the same parts, while it is readily possible to select other setting ranges by using a different type of helical spring, for instance having a different thickness.

Because all parts of the driving unit are pressed together in axial direction, the axial play will be virtually zero.

The helical spring, which can for instance be manufactured from wound steel wire, can also act as protection for the other parts of the driving unit.

Many motors that are standardly available can be supplied in different capacities, and as to outward appearance, the motor types having mutually different capacities differ from each other only by different lengths. In such cases, the driving unit can readily be adapted to stronger motors through the use of a longer helical spring. In this respect, the use of a planetary gearing is advantageous, because these transmission systems can be manufactured with different ratios of transmission while the outside dimensions remain the same.

It will be understood by a skilled person that it is possible to change or modify the embodiment shown of the device according to the invention without departing from the inventive concept or the protective scope. For instance, it is possible that the helical spring 60 has a cylindrical shape, but the helical spring 60 may also taper.

Further, the transmission system 20 need not be a planetary gearing; by way of example, it is also possible to use a so-called "harmonic drive".

Further, it is possible that the entire driving unit is confined dust-tight in a flexible cover, for instance made of rubber, which extends around the helical spring 60 and can for instance engage the pressure rings 40 and 50.

Further, it is possible that the pressure ring 40 at least partly has the form of a cylinder extending from the second output shaft 23 in the direction of the second pressure ring 50, with the contact face 41 of the pressure ring 40 then being formed on the surface of that cylinder at a position shifted closer to the second pressure ring 50, so that the spring 60 can be shorter and stiffer.

With regard to the friction coupling 30, it is observed that it can have any suitable form. In the example shown, the surface 32 of the slip member 31 is represented as a flat surface perpendicular to the central axis. It is also possible that the surface 32 of the slip member 31 is a conical surface. Further, it is possible that the slip merter 31 comprises a pack of friction plates, as will be understood by a skilled person.

With regard to the second pressure ring 50, it is observed that the helical channel 52 may also have a length of more than 360°, for instance 720°. Preferably, the first pressure ring 40 has a contact face 41 which also has the shape of a helical channel to be adapted to the helices of the spring 60. By virtue of these features, the advantage is achieved that the spring 60 finds support throughout its circumference and can transmit its force in an even manner and distributed throughout its circumference, so that the resultant of the force exerted by the spring 60 is and remains axially directed in an optimum manner, also when the spring is extended less or more.

Because in accordance with the present invention, the helical spring 60 engages the pressure rings, 40 and 50 via its helices, the advantage is achieved that the ends of the helical spring 60, during the manufacture thereof, need not undergo a finishing operation. Usually, a pressure-loaded helical spring exerts its pressing force via its end faces. In order to obtain a symmetrical, axially directed pressing force distribution that is optimally distributed over the circumference of the pressure spring, an end portion of the last helix of the spring should be bent over, and that end face should be ground. Such operations are relatively expensive.

Finally, it is observed that the second pressure ring 50 can be extended rearwards so as to receive a possibly unused end of the spring 60. The second pressure ring 50 can have a cylindrical outer surface which covers such unused end of the spring 60, so that, as it were, a storage chamber is defined for that unused end of the spring 60.

I claim:

1. A driving unit (1), comprising;
   a motor (10) with a motor housing (11) and a driven shaft (12);
   an output shaft (2) driven by the motor (10); and
   a transmission device (20) coupled between the motor (10) and the output shaft (2), the transmission device (20) comprising a planetary gearing and having one input shaft (21), a first rotational output member (22), and a second rotational output member (23), wherein a ratio of transmission from the input shaft (21) to the first rotational output member (22) differs from a ratio of transmission from the input shaft (21) to the second rotational output member (23);
   wherein a slip coupling (30) is coupled between the first rotational output member (22) and an axial front face (14) of the motor housing (11), while the second rotational output member (23) is connected to the output shaft (2);
   wherein pressure means (60) are provided to exert an axially directed pressing force on the first rotational output member (22) and the motor housing (11) in order to press the first rotational output member (22) and the motor housing (11) towards each other, said pressure means (60) comprising an extended helical spring (60) which is positioned so as to be substantially coaxial to the motor (10) and extends around the motor housing (11);

and wherein means are provided to vary the pressing force of the pressure means (60) in order to set a slip value of the slip coupling (30).

2. A driving unit according to claim 1, wherein a slip member (31) is provided between said first rotational output member (22) and said axial front face (14) of the motor housing (11).

3. A driving unit according to claim 2, wherein the helical spring (60), at one side thereof, acts on the first rotational output member (22) and, at the other side, engages the motor housing (11) with the interposition of a setting member (50).

4. A driving unit according to claim 3, wherein the helical spring (60) engages the first rotational output member (22) with the interposition of a first pressure ring (40).

5. A driving unit according to claim 4, wherein the first pressure ring (40) has the shape of a cap extending over the transmission device (20), said cap being provided with an opening (42) through which the output shaft (2) can engage power-transmitting members, and being further provided with fastening members (43).

6. A driving unit according to any one of claims 3–5, wherein the helical spring (60) engages an axial rear face (16) of the motor housing (11), wherein the setting meter (50) is designed as a second pressure ring (50) with a helical channel (52) in which at least a portion of a coil of the helical spring (60) fits, and wherein the setting member (50) is rotatable relative to the motor housing (11) and relative to the helical spring (60).

* * * * *